United States Patent
Hawkins et al.

(10) Patent No.: US 6,389,421 B1
(45) Date of Patent: May 14, 2002

(54) HANDLING PROCESSOR-INTENSIVE OPERATIONS IN A DATA PROCESSING SYSTEM

(75) Inventors: John Christopher Hawkins, Winchester; John Bryan Ibbotson, Salisbury; Mark Patrick Nuttall, Eastleigh, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,322

(22) Filed: Aug. 4, 1998

(30) Foreign Application Priority Data

Dec. 11, 1997 (GB) ............................................. 9726202

(51) Int. Cl.$^7$ ............................................. G06F 17/30
(52) U.S. Cl. ..................... 707/10; 707/104.1; 709/217; 709/218
(58) Field of Search ................................ 709/100, 101, 709/102, 103, 106, 108, 312, 217, 218, 219; 707/10, 104.1; 713/164, 187

(56) References Cited

U.S. PATENT DOCUMENTS

| | | | |
|---|---|---|---|
| 5,274,768 A | | 12/1993 | Traw et al. |
| 5,917,912 A | * | 6/1999 | Ginter et al. ............... 713/187 |
| 5,956,716 A | * | 9/1999 | Kenner et al. ............... 707/10 |

FOREIGN PATENT DOCUMENTS

| | | |
|---|---|---|
| EP | 0651554 A1 | 5/1995 |
| GB | 2320594 A | 6/1998 |
| JP | 07200635 A | 4/1995 |
| JP | 09034730 A | 7/1997 |

OTHER PUBLICATIONS

Borealis Image Server; Eric A. Meyer and Peter E. Murray; Case Western Reserve University, Cleveland OH. USA. Ref. #1.
Ref. #2.
Ref. #3 Oct. 1997.

* cited by examiner

Primary Examiner—Majid Banankhah
(74) Attorney, Agent, or Firm—Thomas A. Beck; Louis P. Herzberg

(57) ABSTRACT

Provided are a system and a method for data retrieval which identify from requested data retrieval operations those operations which require a particular processing task to be performed, and then separate those operations from operations not requiring the processing task. The separated sets of tasks are queued separately for independent processing. This enables resource scheduling to be performed which avoids the operations which do not require performance of the task from having to wait for the operations which do require the task. This is an advantage where the task is a processor-intensive task such as digital watermarking of images.

A particular resource allocation method includes enqueuing the set of operations requiring the processing task in a circularly linked list and then employing a scheduler to implement a round-robin allocation of resources for each of the system users in turn.

Also provided is a pre-fetch policy whereby sets of data objects are retrieved from a data repository for processing in response to data retrieval requests and post-retrieval processing such as watermarking is initiated before an individual data object in the set has been selected.

23 Claims, 14 Drawing Sheets

HANDLING PROCESSOR-INTENSIVE OPERATIONS IN A DATA PROCESSING SYSTEM

FIELD OF INVENTION

The present invention relates to data processing systems and methods, and in particular to a method and a system for handling processor-intensive operations in a data processing system such as a computer-based data retrieval system. The invention is useful for allocating resources in a data processing system and/or for reducing data access delays.

BACKGROUND OF INVENTION

Data libraries which are accessible from any one of a large number of computer terminals within a distributed network are well known in the art. As the Internet, intranets and the World Wide Web have gained in popularity, and imaging systems have become more widely available, libraries of images and other data objects have been stored on server computers and connected for access by many people via the Internet or intranet. Individuals can, for example, request copies of required objects such as images using a Web Browser installed on a client computer connected to the Internet.

Making data objects such as images accessible to many users can create opportunities for malicious parties to replace the images on the server with forgeries, or to intercept and replace images that have been transmitted to others. In addition, with the development of sophisticated image editing software, tools which allow easy alteration of the content of any digital image are widely available. Thus, the integrity of a digitally stored image may be in question unless safeguards are provided.

Watermarking and digital signature techniques have been developed which allow verification of the source and integrity of an image (i.e. detection of any changes to it), as well as providing a means for checking that the user is authorised to access the image (by only allowing access if the requester knows the digital signature), and enabling subsequent identification of unauthorised copies. Thus, watermarking and digital signature techniques are beneficial to image owners and licensors and can also be beneficial to those requesting image access.

An end user may specify a digital signature of an image when requesting the image file either a) if the data retrieval system requires this before it will deliver the file or b) if the user wishes to check the authenticity and integrity of the image before it is delivered to them. Additionally, a data retrieval server may be adapted to perform dynamic digital signature checking of images even if the user is not required to know the signature.

In addition to digital signature checking, a server computer may be adapted to dynamically execute a watermarking process, either for all stored objects or only for certain categories of object or certain categories of requester, when it receives a request for a copy of an object. This watermarking enables subsequent identification and verification. Since images as stored in a digital image library may not have watermarks, it may be desired to watermark the images prior to distribution of copies in order to embed information such as the identity of either the distributor or the requester.

A problem which arises with systems which perform watermarking dynamically (i.e. when an object is requested from a repository, rather than when the object is stored in the repository or earlier, which is the conventional approach) is the time delay that an end user can experience while waiting for the object to be delivered. Dynamic watermarking is a computer processor-intensive operation leading to the possibility of delays in object retrieval. These delays increase with the number of requests being processed concurrently.

Such delays may be considered particularly undesirable for users who have requested objects for which no signature checking or watermarking is required, since in this case their retrieval and delivery operations involve relatively little processing but can be significantly delayed by digital watermarking of objects for other users.

SUMMARY OF INVENTION

It is a first aspect of the present invention to provide a method and a system for data retrieval, the method including:

responsive to receipt of data retrieval requests by the data retrieval system, identifying requested data retrieval operations requiring a first predetermined task to be performed;

inputting into a first processing queue only the data retrieval operations requiring said first predetermined task to be performed;

handling data retrieval operations which do not require said first predetermined task to be performed without performing said first predetermined task; and processing the data retrieval operations in the first processing queue including performing said first processing task.

A data retrieval method according to the invention preferably also includes inputting into a second processing queue separate from said first queue data retrieval operations which require a second predetermined task but do not require said first predetermined task, and processing said first and second queues independently.

The first predetermined task is preferably the performance of a watermarking process. By separating simple rretrievals from retrieve-and-watermark operations, which are processor-intensive, it is possible to avoid retrieval operations (and hence users) not requiring watermarking from being overly impacted by the resource demands of users whose requested data objects do require watermarking.

Methods and systems according to one embodiment of the invention determine for each received request both whether watermarking is required and whether a second post-retrieval processing task is required (such as digital signature checking, or conversion from TIFF format to JPEG format). Simple data retrieval operations and retrieval-with-signature-checking operations can then be separated from retrieval-with-format-conversion operations, and all of these are separated from retrieval-with-watermarking operations.

Alternative embodiments of the invention may separate processing operations according to both the size of the requested object and the particular tasks to be performed on it.

Thus, requested data retrieval operations are separated for processing according to the predicted resource requirements of carrying out that processing. This facilitates improved resource allocation and enables a reduction of the delay experienced for operations which are not processor intensive.

The data retrieval operations requiring performance of one or more predetermined tasks are preferably identified by comparing a data-object-identifier obtained from a received request with a table of object types and required processing tasks for each type.

The first and second processing queues are preferably circularly-linked lists to which requested data retrieval operations are added, the operations being indexed according to the ID's of their end user requesters. Each node in the first ring (circularly-linked list) contains a list of all of the operations to be performed for a respective user which require the processor-intensive first post-retrieval task, and each node in the second ring contains a list of all of the operations to be performed for a respective user which require a second post-retrieval task.

The independent processing of each circularly-linked list preferably involves serving each of the plurality of users on a 'round-robin' basis, under the control of a scheduler, with a predetermined amount of processing being performed for each user each time that user's tasks in the respective linked-list are given attention. This "predetermined amount of processing" is preferably either an equal amount of processing time (e.g. 2 seconds of CPU time) for each user, or the completion of one or more particular processing tasks for one or more requested objects for each user. Alternatively, predetermined but different amounts of processing may be performed for different categories of user.

It is a second aspect of the present invention to provide a method and a system for allocating data processing resources between users of a data retrieval system, the method including:

- inputting data retrieval requests to a scheduler within the data retrieval system;
- identifying requested data retrieval operations requiring performance of a predetermined processor-intensive task (e.g. watermarking);
- retrieving requested data objects from a repository;
- inputting into a first circularly-linked-list the data retrieval operations requiring performance of said predetermined task, the operations being indexed according to their end user requesters;
- handling data retrieval operations which do not require performance of said predetermined task without performing said predetermined task; and
- processing data retrieval operations in said first circularly-linked-list, including performing said predetermined task, in a circular sequence such that a predefined unit of processing is performed for each end user requester in turn.

The handling of data retrieval operations which do not require said predetermined processor-intensive task may simply involve delivery to the requester without performance of post-retrieval processing. Alternatively or additionally, data retrieval operations which do not require the first processor-intensive task but do require a different post-retrieval task (e.g. TIFF to JPEG format conversion, or digital signature checking) may be input into a second circularly-linked-list separate from said first circularly-linked-list, the operations in the second list being indexed according to their end user requesters. The second list is then processed in a circular sequence independently of processing of the first list such that for each list a predefined unit of processing is performed for each end user requester in turn.

The time that users spend waiting for objects from a digital object library is preferably also reduced by limiting to only one CPU-intensive watermarking process per processor. If multiple processors are available (on one or more computers), each may run a watermarking process such that there may exist as many watermarking threads as there are processors to run them without adversely affecting processing throughput.

Limiting to one watermarking thread per processor can avoid the reduction in overall throughput which may result from multiple processor-intensive threads running simultaneously on a single processor. This is achieved in a preferred embodiment of the invention by means of a control process which only starts one such thread on each processor and which obtains new tasks from the watermarking process input queue only when a previous watermarking operation is complete. This is distinguished from the alternative approach of invoking new instances of the watermarking process whenever a request is received and there is no currently available instance of the watermarking process to handle it.

Because dynamic watermarking is so processor-intensive, only one such operation can be effectively handled at one time. Simultaneously running two watermarking processes on the same processor will cause the tasks to take more than twice as long as each would take if run serially, because there is a small delay each time usage of the processor is switched. Thus, the user will experience a delay whichever one of two objects he wants to access. For example, if an object takes 10 seconds to watermark, running two watermarking threads in parallel on a single processor may take 24 seconds, rather than the 21 seconds taken to watermark them one at a time.

The limitation to one watermarking thread per processor is particularly advantageous when implemented in accordance with a further aspect of the invention. In this further aspect, images are stored in a hierarchical arrangement of pages within page sets within folders, each page including a full image, a thumbnail image and a digital signature. The system's response to a user's request for access to a page set containing images is to perform the following steps:

(i) to retrieve from the repository all of the thumbnails within pages of the page set and to send the thumbnails to the requester;

(ii) to retrieve from the repository all of the full images within pages of the page set and to initiate digital signature checking and dynamic watermarking of the full images in anticipation of a subsequent user request for a selected one or more of said full images.

Because the watermarking is performed by a single thread per processor, the potential for overloading the processor is reduced and there is an increased likelihood of some of the full watermarked images being available in the server's cache memory within an acceptable time.

Furthermore, the invention according to a preferred embodiment uses a combination of (i) fetching of full images for watermarking in advance of end-user requests for specific images, (ii) initiation of watermarking of these full images by means of a single process on each processor prior to user selection of a specific image, and (iii) promotion of an image within the queue of images to be watermarked in response to that image being selected by the end user from the set of thumbnails. Thus, a selected image is promoted so as to be the next in line for processing following completion of a current in-progress watermarking task.

By allowing for promotion in response to user selection, in a system which pre-fetches images for processing and limits to one processor-intensive process running on each processor, user access delays are significantly reduced.

A method, a data retrieval system, or a resource manager according to the invention may be implemented within a computer program product comprising computer readable program code stored on a computer readable storage medium.

The invention is particularly suitable for use with computer-based image libraries, but may be used for retrieval by a data retrieval system of any data objects where some of the data retrieval requests require a relatively slow processing operation to be performed and others do not; undue delays of the 'fast' retrieval requests can be avoided by separating their processing from the processing of the 'slow' retrieval requests.

BRIEF DESCRIPTION OF DRAWINGS

An embodiment of the present invention will now be described, by way of example, with reference to the accompanying drawings in which:

FIGS. 2 to 12 show the sequences of steps implemented by various components of the system in the retrieval of data objects from a repository and the performance of selected tasks prior to delivery to a requester, in accordance with an embodiment of the invention, as follows:

FIG. 2 shows the steps performed by a client assembly application, a client browser, and a renderer applet;

FIG. 3 shows the steps performed by a data retrieval servlet;

FIG. 4 shows the steps performed by a data delivery servlet;

FIG. 5 shows the steps performed by a name converter system;

FIG. 6 shows the steps performed by a cache manager;

FIG. 8 shows the steps performed by a data library connection component;

FIG. 9 shows the steps performed by a work scheduler;

FIG. 10 shows the steps performed by a watermarker process;

FIG. 11 shows the steps performed by a worker process manager;

FIG. 12 shows the steps performed by a watermark image cleaner forming part of the watermarker process.

DESCRIPTION OF PREFERRED EMBODIMENT

Figure 1:
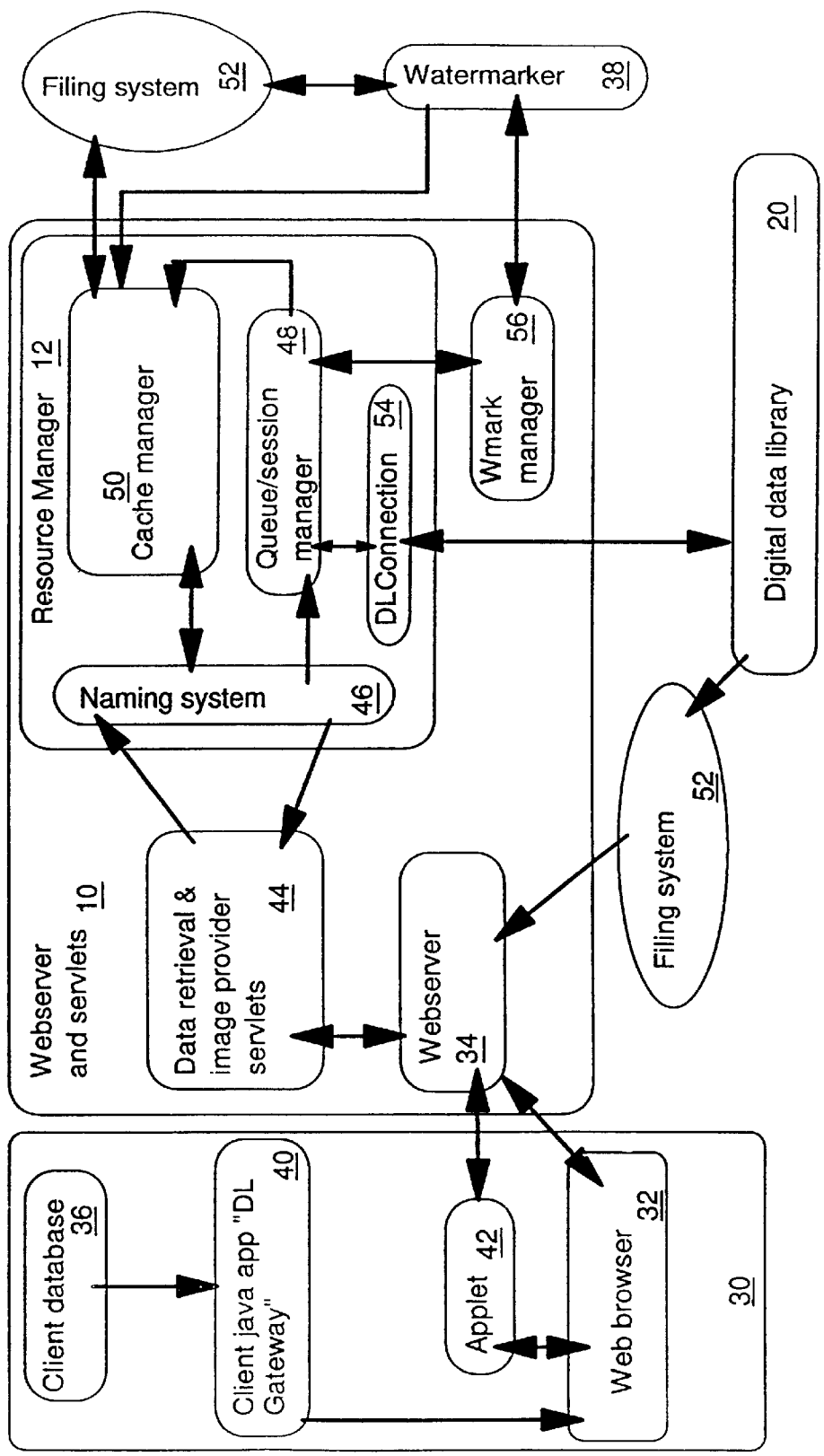
FIG. 1 is a schematic representation of a client-server distributed data retrieval system and associated digital image library.
Figure 2:
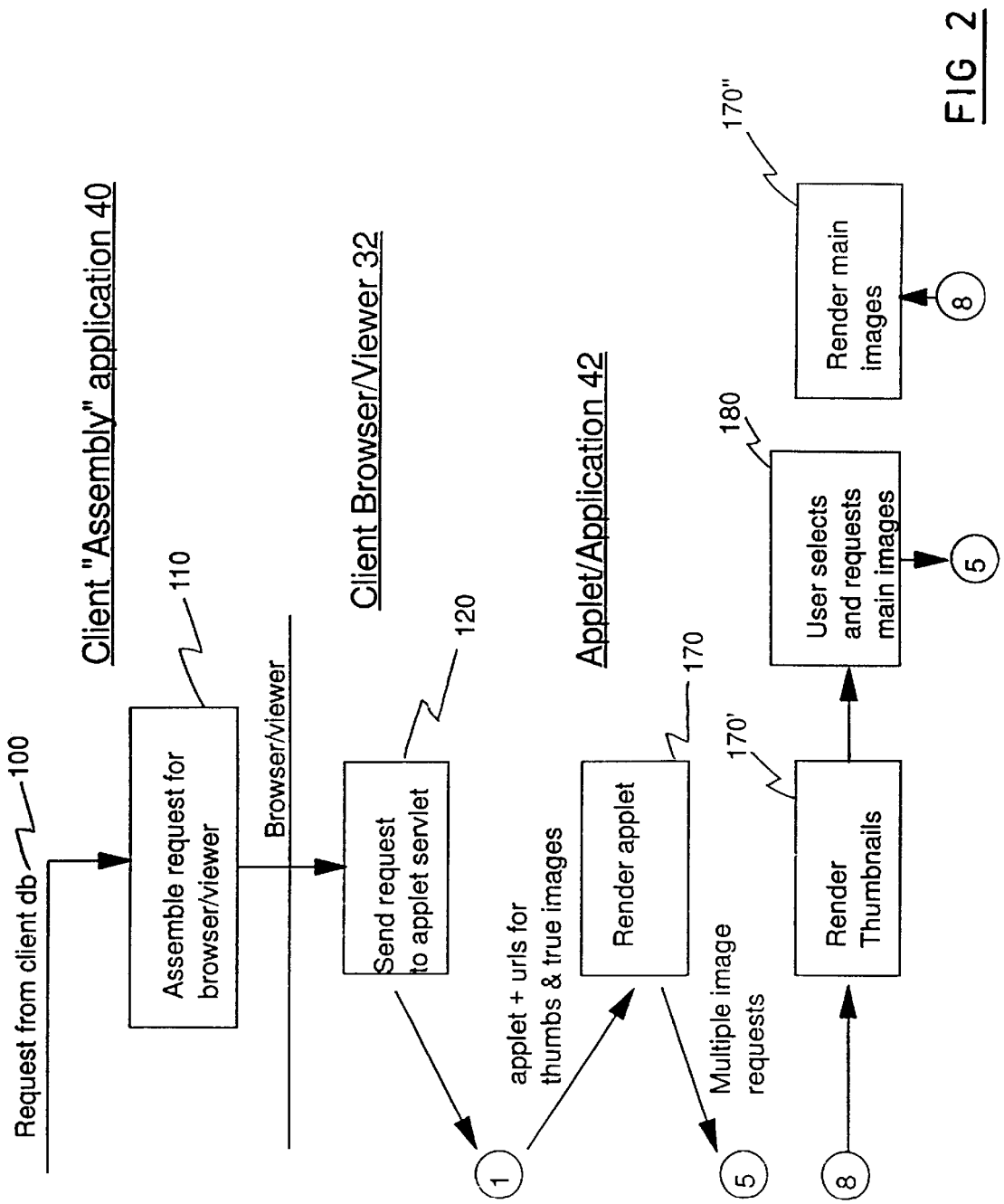
Figure 3:
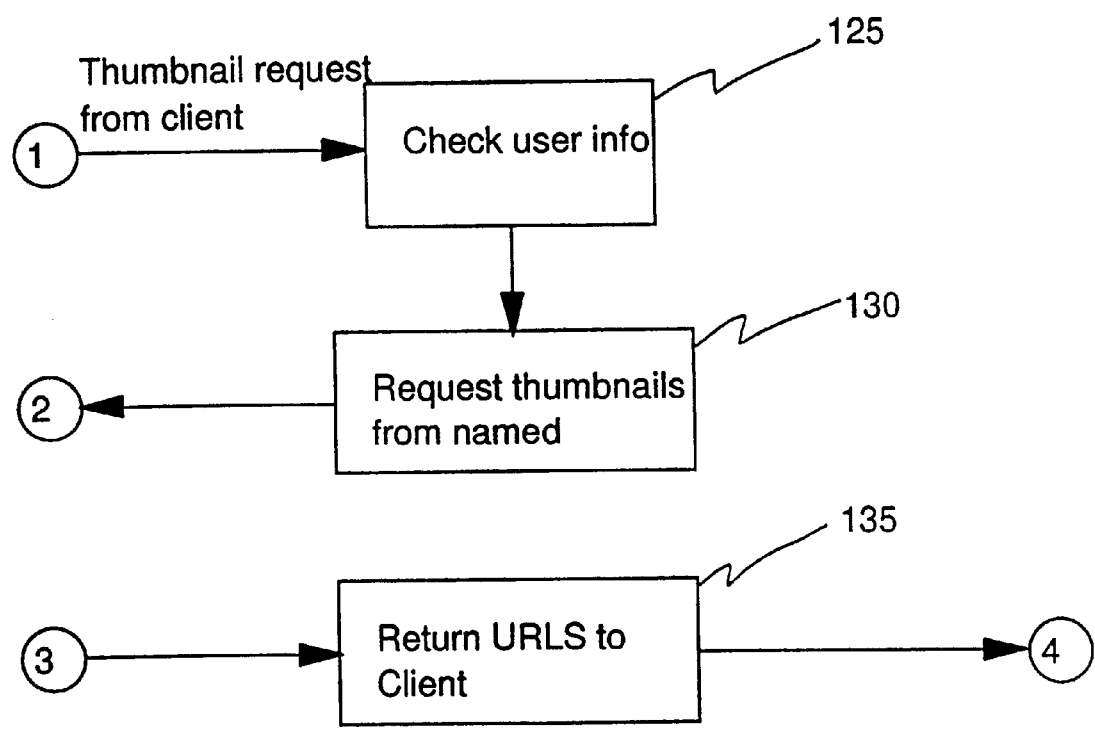
Figure 4:
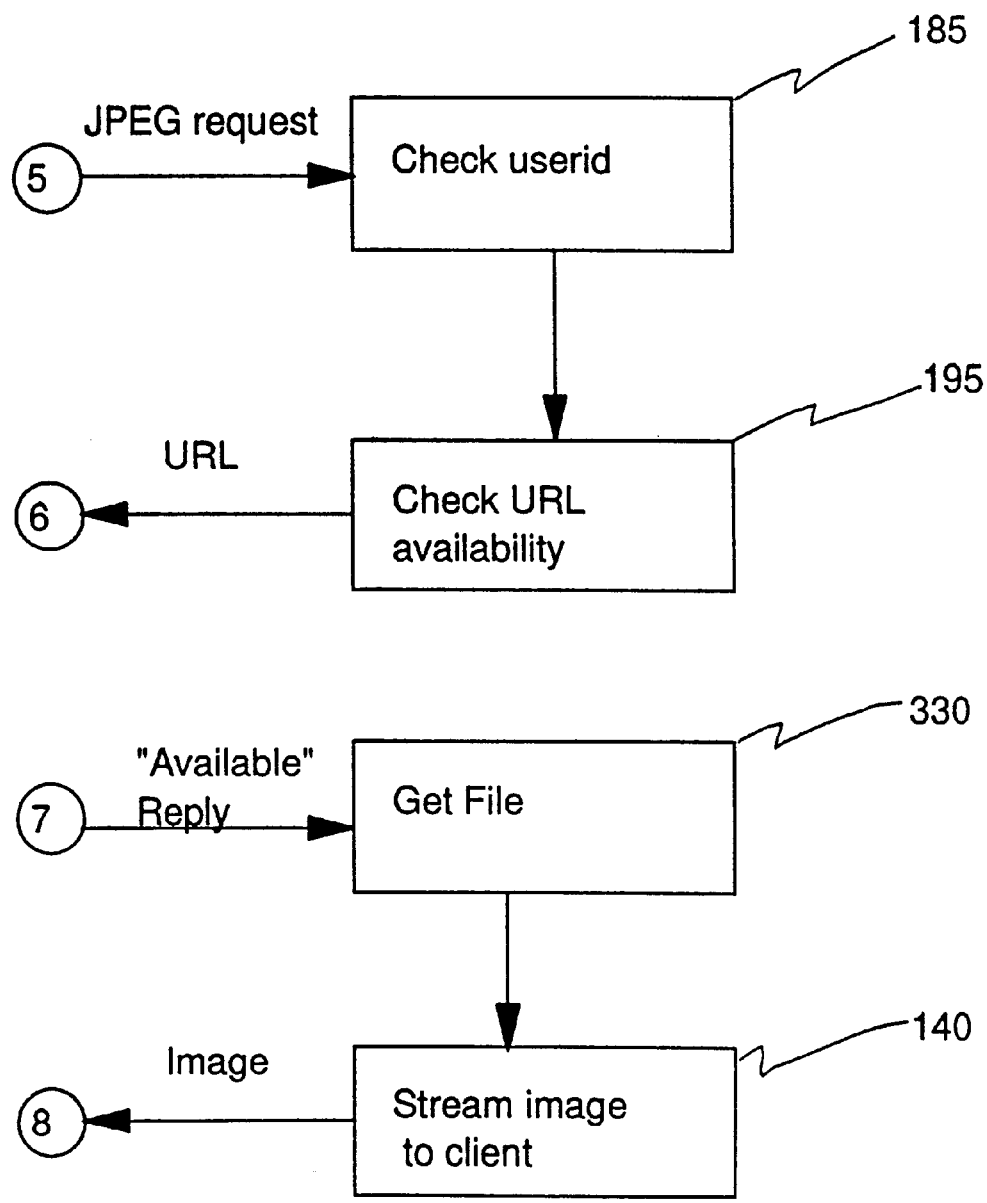
Figure 5:
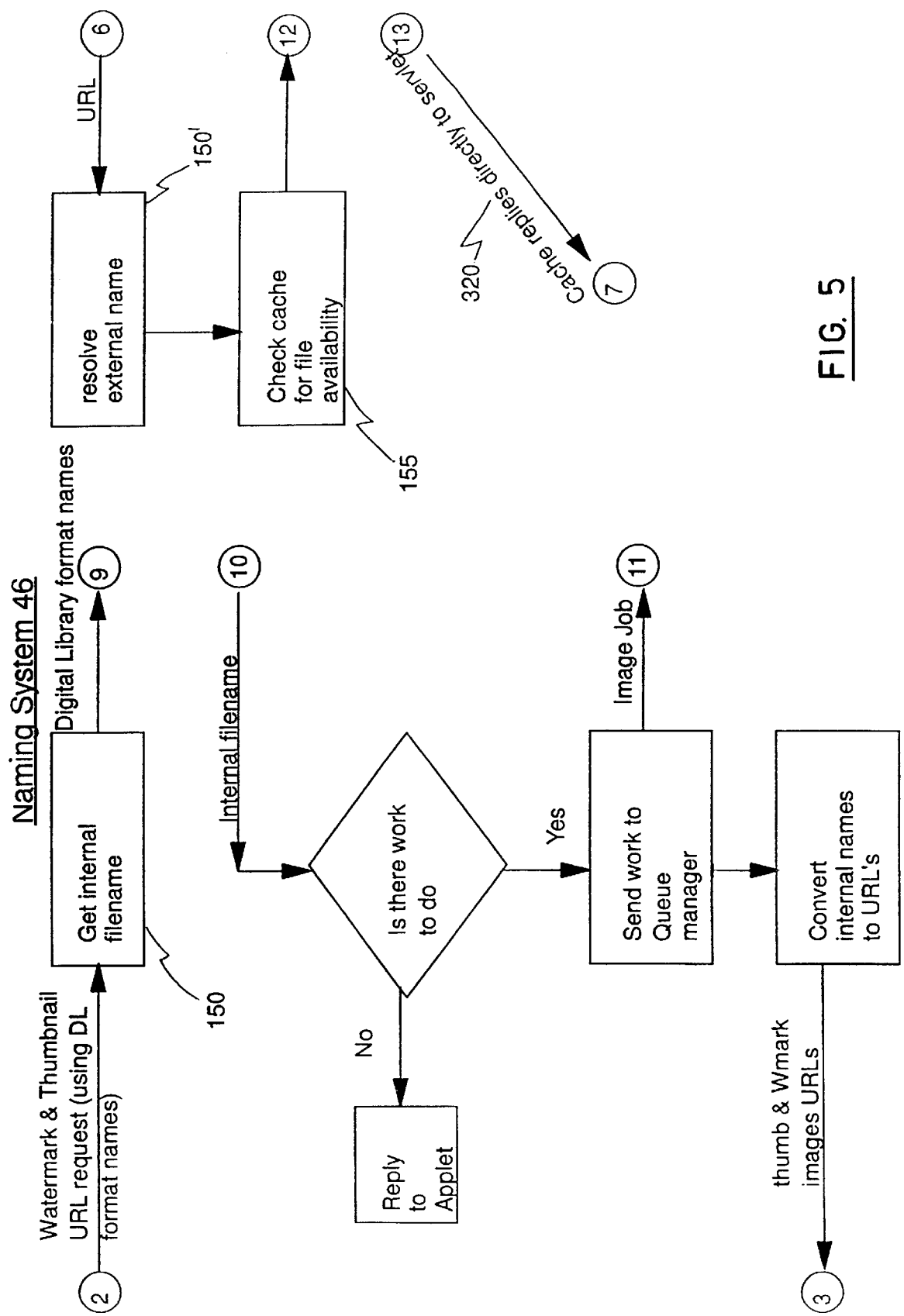
Figure 6:
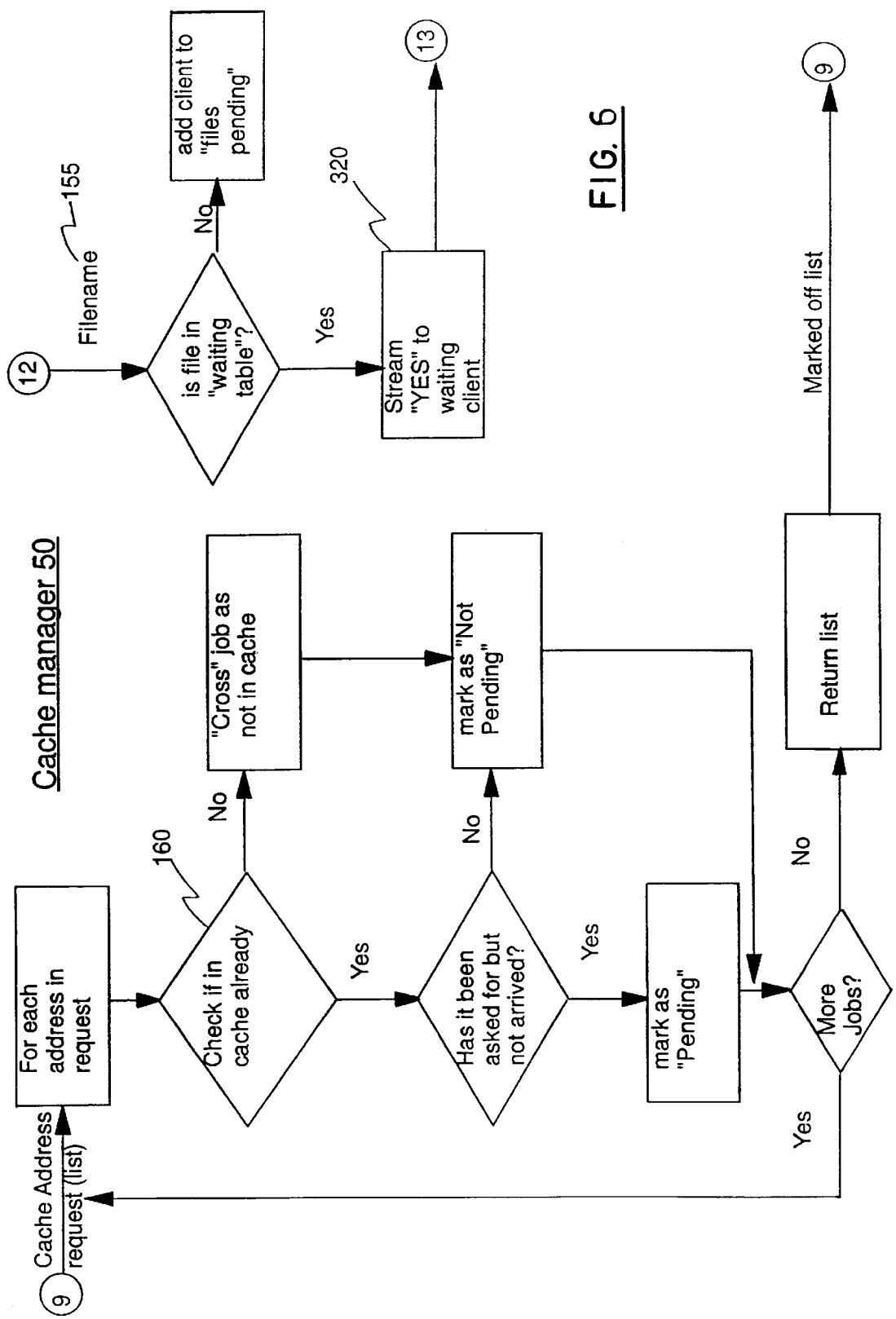
Figure 7A:
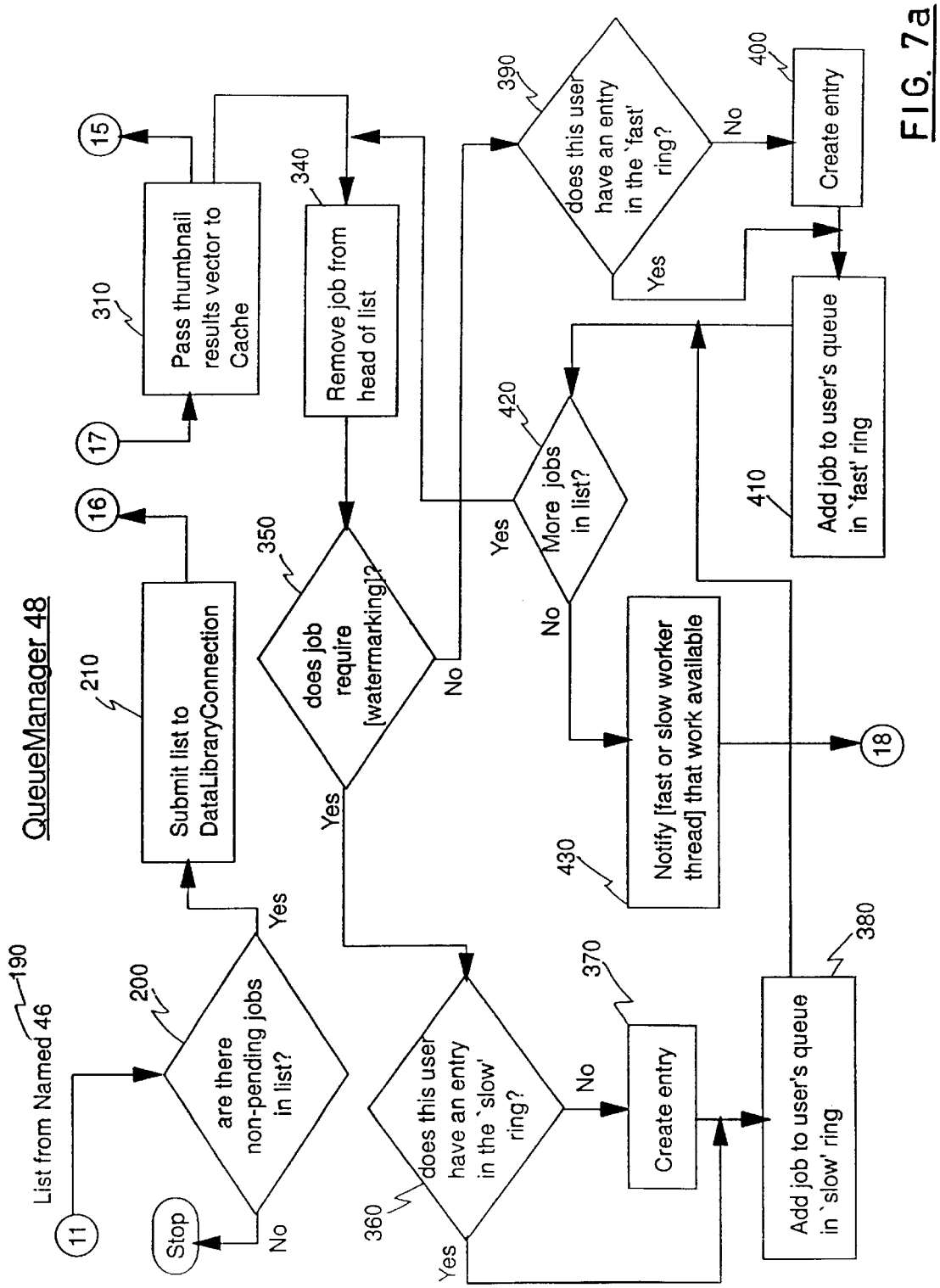
FIGS. 7a and 7b show the steps performed by a queue manager
Figure 7B:
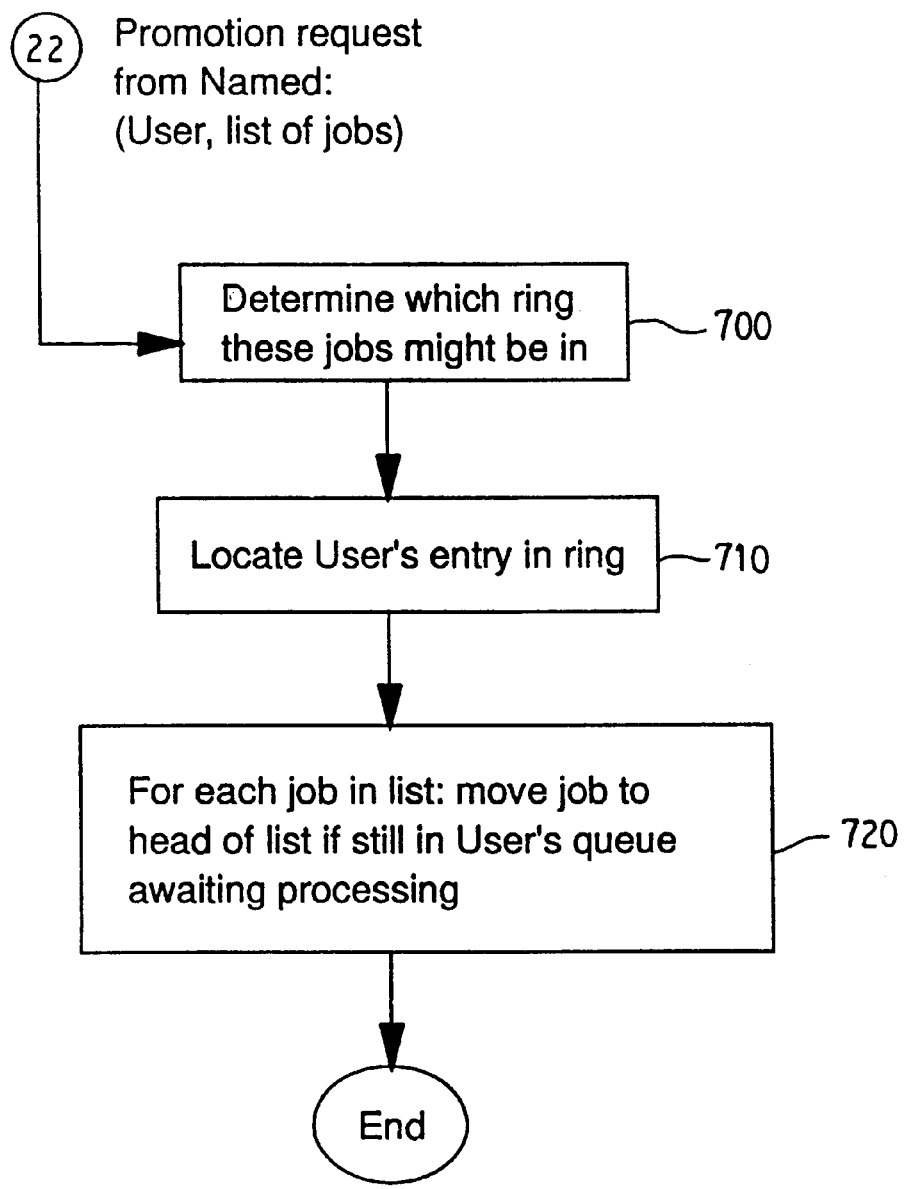
Figure 8:
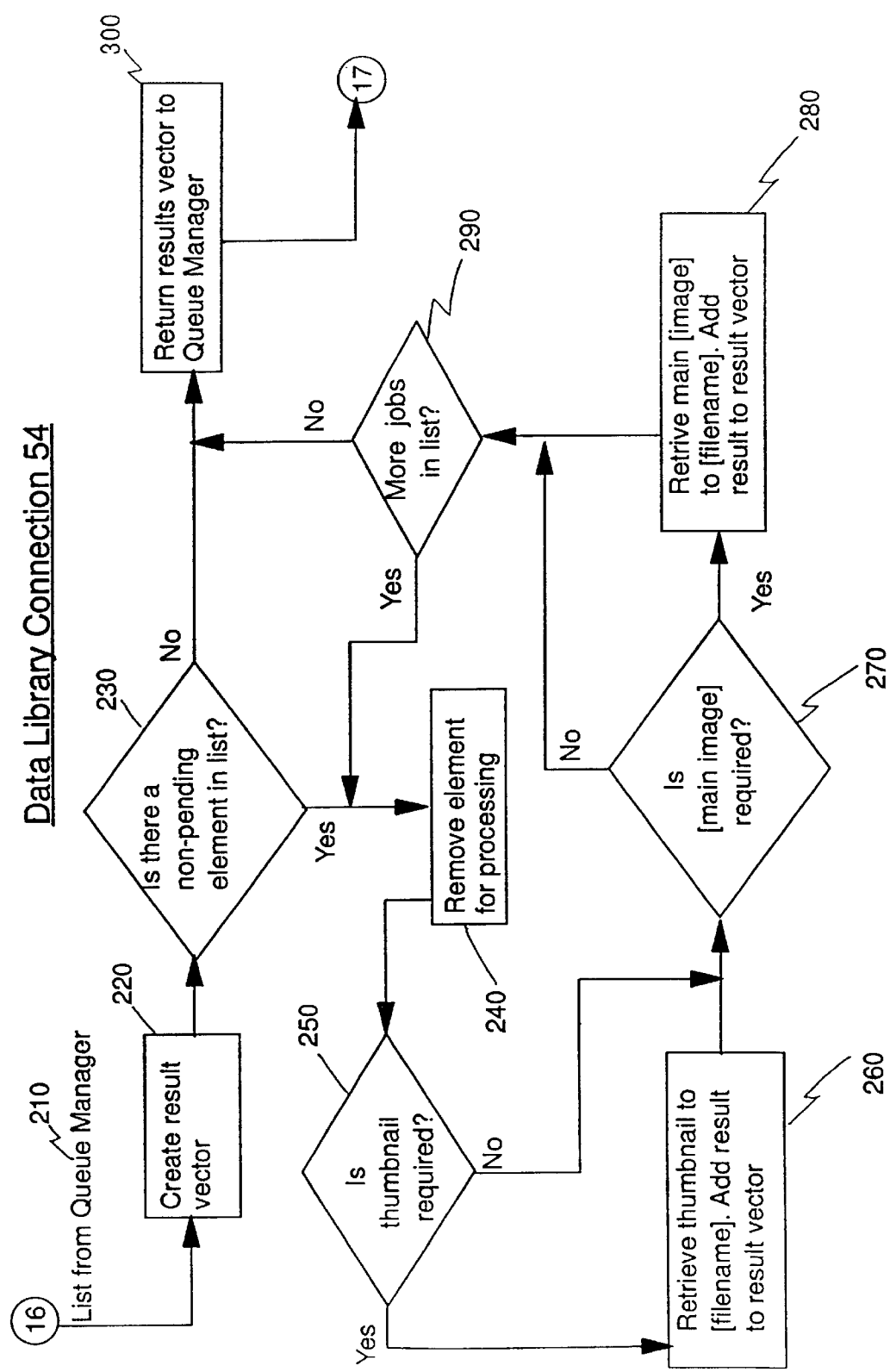
Figure 9:
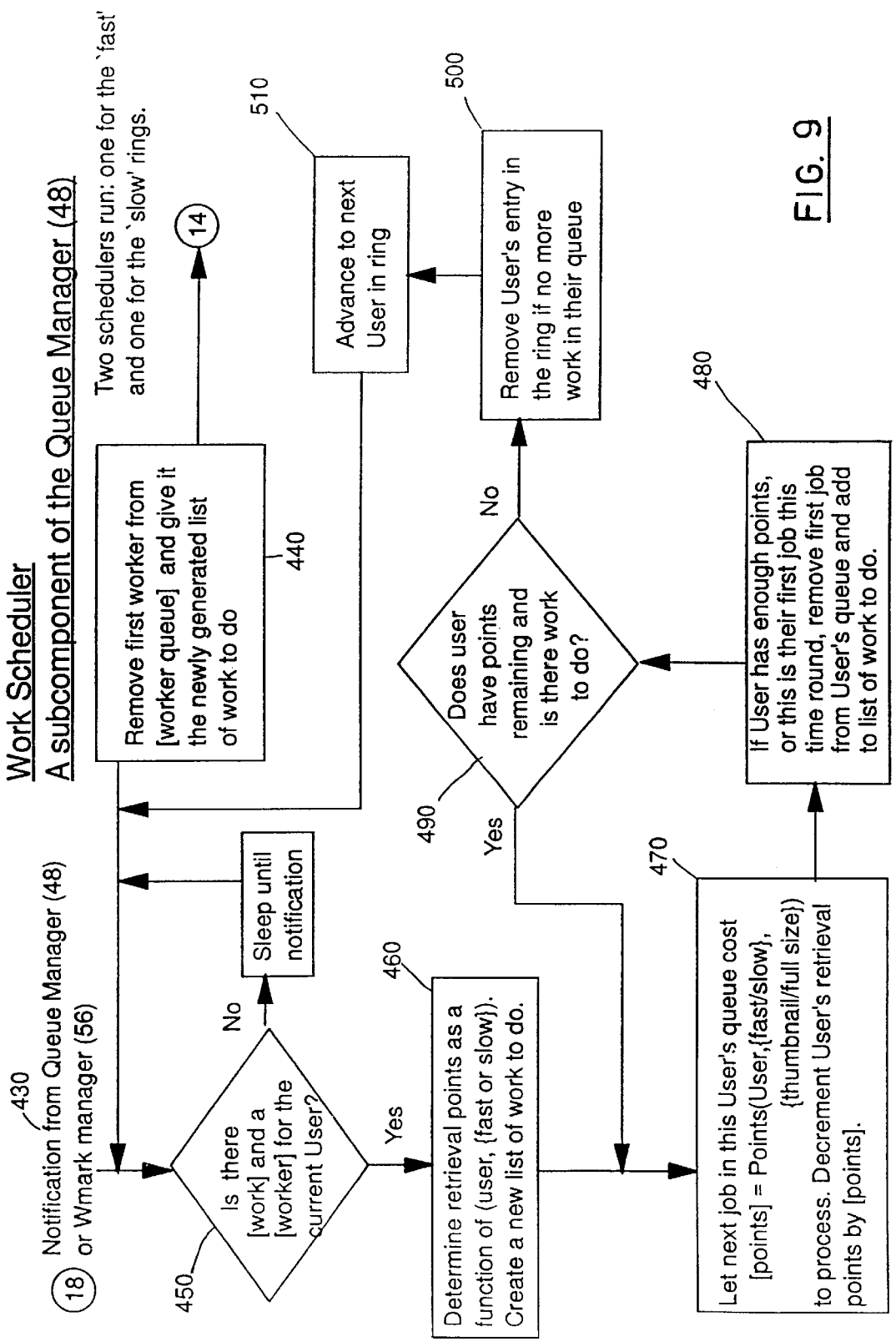
Figure 10:
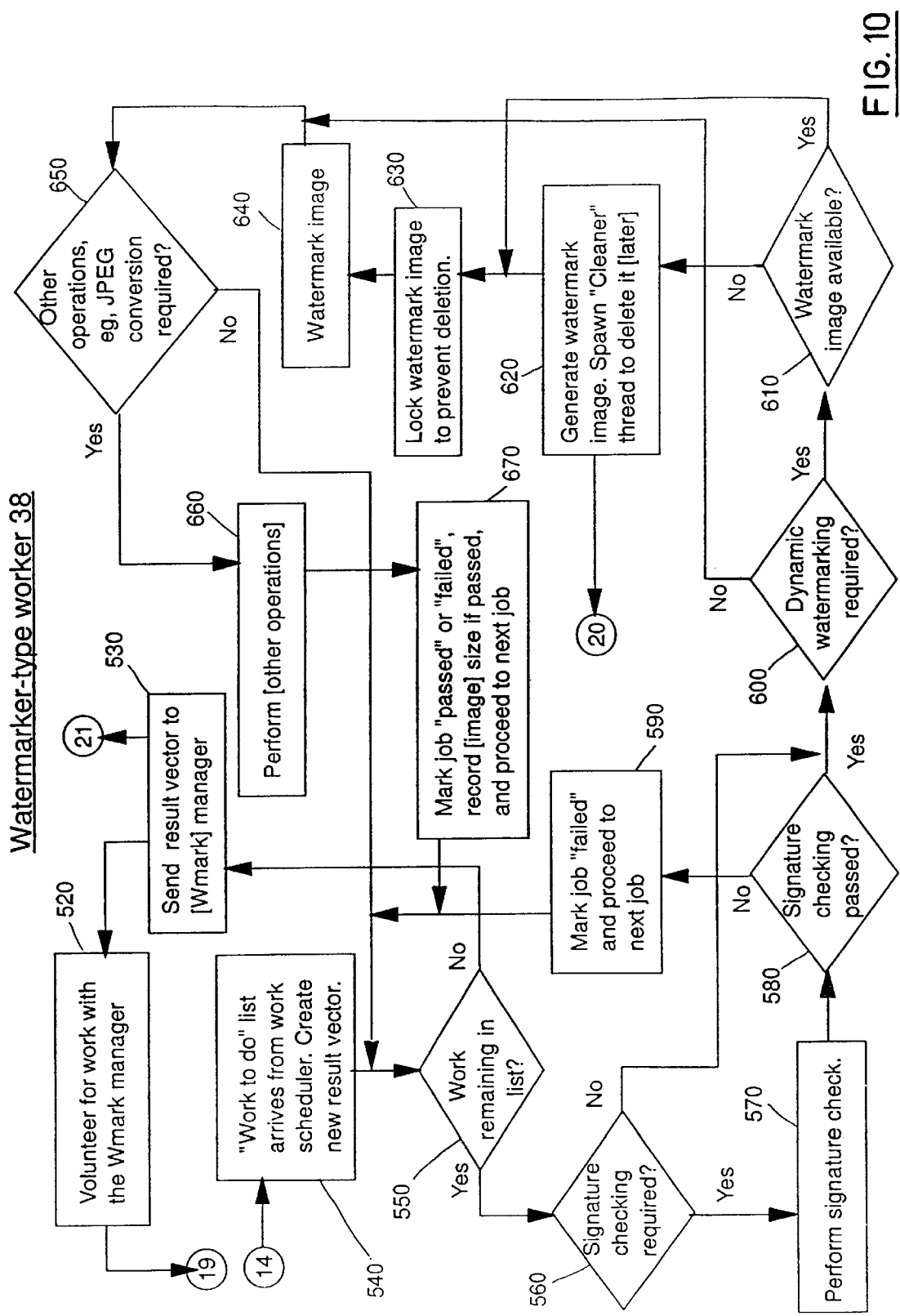
Figure 11:
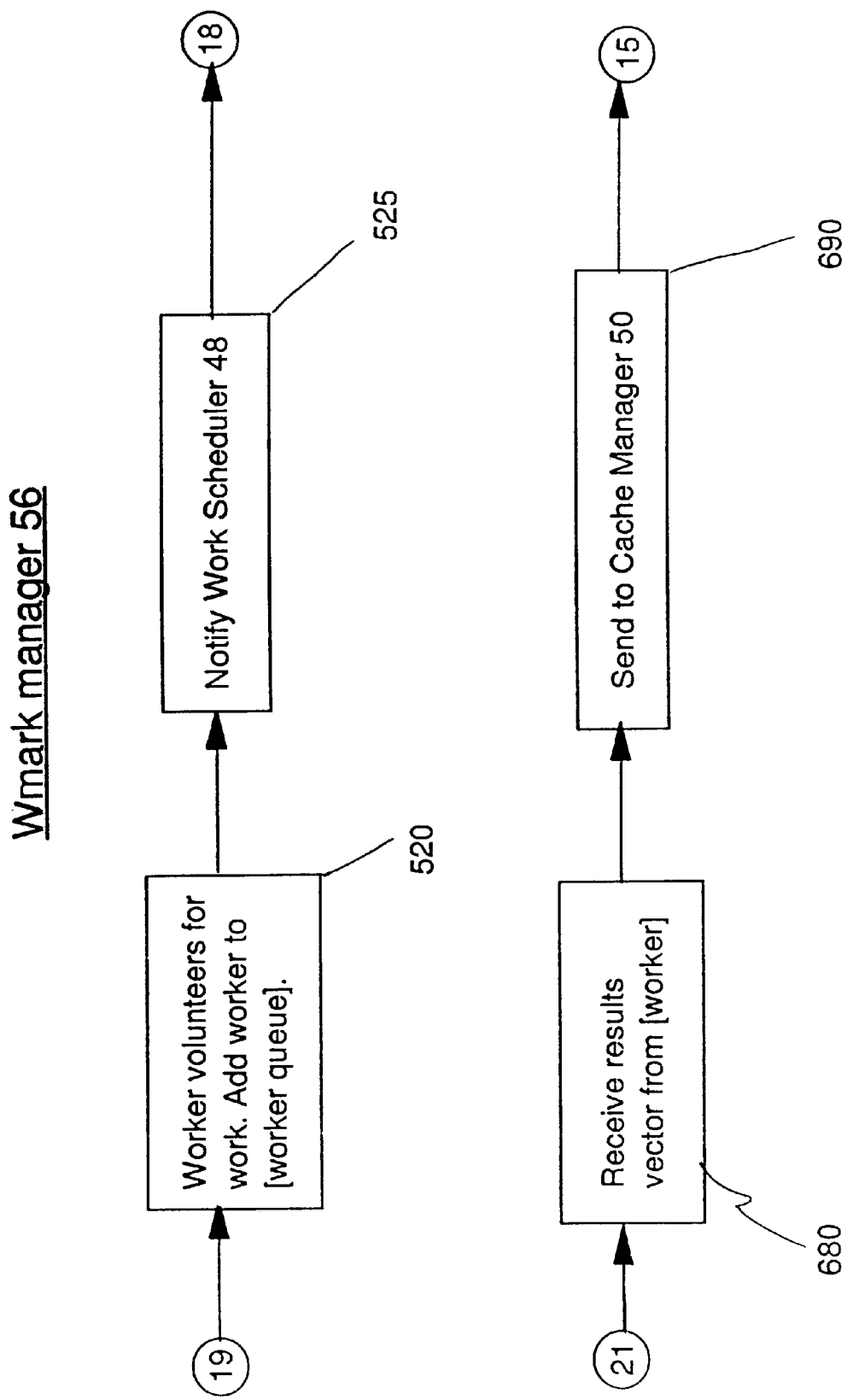
Figure 12:
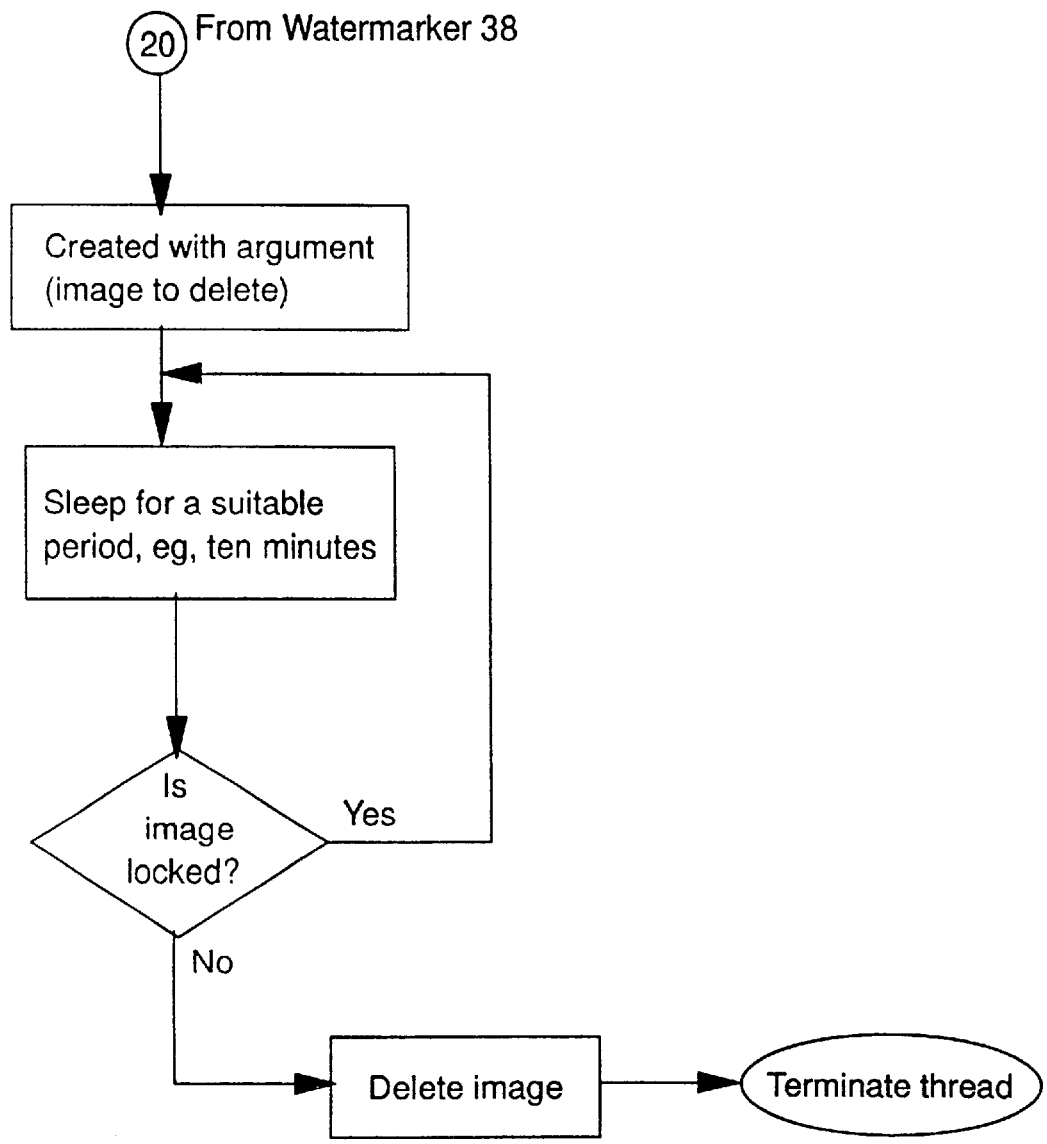

A client-server distributed data retrieval system implementing the present invention in accordance with an embodiment of the invention is shown in FIG. 1. A data retrieval system 10 comprising data retrieval management software installed on a server computer is connected for accessing stored objects in a digital data repository 20. As is known in the art, the repository may be provided by disk storage which is peripheral to the server computer of the data retrieval system, or which is associated with another server computer, or a digital image library may be distributed across a number of storage systems. The data retrieval system may be connected within a distributed network for access to a plurality of libraries or repositories.

The data retrieval system 10 is connected to one or more client systems 30, from which end user requests for library access may be received. The data retrieval system 10 includes a resource manager 12 which is described in detail below.

Each client system is equipped with Web Browser software 32, such as the known Netscape Navigator (TM) Browser, and the data retrieval system 10 includes Web server software 34 for receiving across the network and responding to Web Browser requests (in the preferred embodiment, the client, server and data repository communicate across an intranet, but this could equally be implemented across the Internet if access by external end users is required, or across any suitable network).

The client system 30 also includes a database 36 storing object container names and associated object metadata from which users select names when generating client requests. These object container names are used to identify object containers stored in the library. The client container names are not the actual stored object names or object container names as used within the digital data library since it is desirable, for security reasons and to shield users from system complexities, to limit end users' access to objects in the digital library to access via the data retrieval operations which are performed automatically by the data retrieval system 10 in response to Web Browser requests.

Thus, a first set of names are stored in the client database 36 and a second set of names are used within the digital data library, and a name interpreter 46 in the data retrieval system interprets names in the first set to obtain names in the second set for identifying stored objects.

Within the data retrieval system 10 is a watermarker process 38 for dynamically applying watermarks to requested images—i.e. for applying watermarks to images when the images are retrieved from the library for delivery to a requester. Traditional digital watermarking is performed when adding an object to a library or at an arbitrary time unrelated to retrieval, when the time taken to complete the watermarking process is less critical.

The present invention provides advantageous scheduling of watermarking and other tasks, but the details of the watermarking algorithm implemented by the watermarker process 38 are not critical to the invention and may be any known watermarking algorithm, visible or invisible, which is suitable for dynamic watermarking. The nature of the information encoded by the watermarker process 38 is also not critical to the invention, but may include the company logo of the image owner, or the ID of the requesting end user, and/or the date and time of retrieval from the library.

A further process on the server 10 is a digital signature checking process (not shown). The watermarking and digital signature checking processes need not be running on the same server computer as the resource manager 12—their functions may be distributed—but use of a single server computer is described herein for simplicity. Yet a further process which runs on the server in the preferred embodiment of the invention is a file format conversion process (not shown). Images are held in the image library in Tagged Image File Format (TIFF), since this maintains high image quality, but TIFF files require a specialised viewer and so the TIFF files are converted prior to delivery to end users into a JPEG file format (i.e. a format conforming to the Joint Photographic Experts Group standard) which allows greater compression and can be displayed under the control of a conventional web browser.

The sequences of operations involved in signature checking, format conversion and watermarking of images in response to end user requests, and delivery of images to an end user both with and without watermarking, will now be described in more detail with reference to FIGS. 2 to 12.

An end user interacts with the client database 36 on client system 30 and initiates a client request 100 by a selection which specifies a client object container name (selected from the names stored in the client database 36). The end user's selection invokes an applet 40 (written in the Java programming language) on the client system, which starts the Web Browser 32 and assembles 110 a Web Browser request with a generated uniform Resource Locator (URL) including the client container name. This request is sent 120 across the intranet to the Web server 34 running on the data retrieval system 10.

The server system 10 is running a plurality of data retrieval and image provider "servlets" 44 (i.e. Java applets which run on the Web server, which are referenced by a URL), a first one for passing 130 received Browser requests to the data retrieval system resource manager 12 and a second one for handling passing 140 of images to the client. Requests received by the web server are passed via a first one of these servlets to the resource manager 12 and a name interpreter 46 within the resource manager converts 150 the client container name of the received request into an object container name which can be understood by the digital library.

Having performed name conversion, the resource manager firstly triggers a cache manager 50 to check 160 whether the requested data object(s) are currently available within the local cache memory 52 of the server system 10. If the objects are already stored in the cache ready for delivery to requesting clients, then the objects are simply provided to the image provider servlet 44 for delivery 140 to the client system using the functions of the Web Server.

The initial response to the request generated in the client system following user selection from the client database is, when the objects are available in cache memory, to return to the client system a set of thumbnails and URLs for the full images associated with those thumbnails, as will be explained later. Otherwise, objects must be retrieved from the data library and many of the retrieved objects will require processing prior to delivery.

The Web server also provides to the client system together with the first delivered data object(s) a Java applet 42 for organising and managing the display (rendering 170) and printing of accessed images within frames. The downloading of such a renderer applet 42 is known in the art.

The client system's Web Browser handles in a conventional manner presentation of images which are rendered by applet 42. As is known in the art, a page generated for presentation to an end user may include a set of thumbnails of images, with embedded URLs to enable the end user to select 180 which of the full images represented by the thumbnails he wishes to receive.

The organisation of data objects within the digital data library facilitates efficient scheduling of post-retrieval processing and delivery of images to the end user, as will now be described. Image objects are stored in the digital data library in hierarchical groups within one or more document Folders, each Folder including at least one and generally many sets of one or more Pages (referred to as Annexes 1 . . . N). Each Page within an Annex has the following attached objects: an image (a TIFF file), a thumbnail image (a JPEG file), and a digital signature. This hierarchy is represented as follows:

```
Doc = Folder
{
    Annex = SET of Folder
    {
        Contains SET of Page
        [
            Image
            TN
            Digital Sig
        ]
    }
}
```

Object container names within requests initially received from the client system in response to user interaction with the client database will be converted to object identifiers at the Annex level (actually a combination of Folder ID and Annex ID, which is assumed to be unique within the system) and so the expected result of a requested data retrieval will be a set of pages rather than a single data object. This gives the data retrieval system an opportunity to begin post-retrieval processing of objects within the Annex before individual ones of those objects have been selected by an end user, which helps to reduce user wait times subsequent to selection. This will be described further below.

When one or more requested objects are not available in server cache memory, the resource manager passes 190 the received request to a queue manager 48 which obtains from the request the ID of the requesting end user and the name of the requested Annex. The received request is then placed in a list (simple FIFO queue) of data retrieval operations to be performed.

The queue manager 48, on receipt from the name interpreter 46 of this list, checks 200 for flags against each element in the list which flags indicate whether the element has already been queued for processing (in response to an earlier request). If this check 200 determines that there are non-pending retrieval operations in the list, the queue manager submits 210 the entire list to a digital data library connection component 54 of the resource manager. The data library connection component 54 creates 220 a result vector (an initially empty list or array which will be a holder for returning the results of the data retrieval to the queue manager), checks 230 each list element to identify the non-pending elements in the list, and then removes 240 these non-pending elements for processing.

The digital data library connection component then determines 250 whether any of the thumbnails of the current required Annex are not available in cache memory, and retrieves 260 from the repository 20 those which are not in cache. The data library connection component next determines 270 whether any of the full images of this Annex are not available in the cache, and retrieves 280 from the repository those full images not in cache.

As noted previously, the requests generated automatically in the client system in response to user interaction with an interface to the client database will lead to retrieval of the contents of an Annex (i.e. a set of pages having attached image objects, thumbnail objects and digital signature objects). In practice, this involves three checks of what is already in cache memory and three scans of the page set—one of the three separate scans retrieving all thumbnails in the set not already in cache, one retrieving all full images not in cache, and one retrieving all signatures not in cache.

The data library connection component then adds 280 the results of its retrieval scans to its result vector for that request. If there are more data retrieval operations (or 'elements') in the list 290, the data library connection component then removes the next element from the list for processing, and so on until all elements have been processed. The data library connection component then returns 300 the results vector to the queue manager.

The queue manager then processes the received results vector in a manner which ensures a fair allocation of processing resources between different end users while minimising the delays that a user experiences before their requests are satisfied, in particular minimising delays for requests which do not require significant processing resources. This will now be described in more detail.

The queue manager 48 implements a policy of separating different types of image for different post-retrieval processing tasks to be performed. This policy, which may be modified by a systems administrator for different implementations of the invention, is as follows:

| Image Type | Processing |
| --- | --- |
| Thumbnail | None |
| Full Image (authorised use) | Signature check, Convert format |
| Full Image (standard use) | Signature check, Convert format, Apply user-specific watermark |

The queue manager 48 identifies thumbnails via flags in the results vector and separates from a received results vector the thumbnail images and passes these 310 to the cache manager 50 without further processing. The cache replies 320 directly to the image provider servlet 44 that the thumbnails are available. The image provider servlet then retrieves 330 a file containing the thumbnails associated with the user's request and streams 140 the thumbnail images to the client system where they are rendered 170 for display to the end user. The user is then able to select 180 and request desired main images from the displayed thumbnails.

Figure 13:
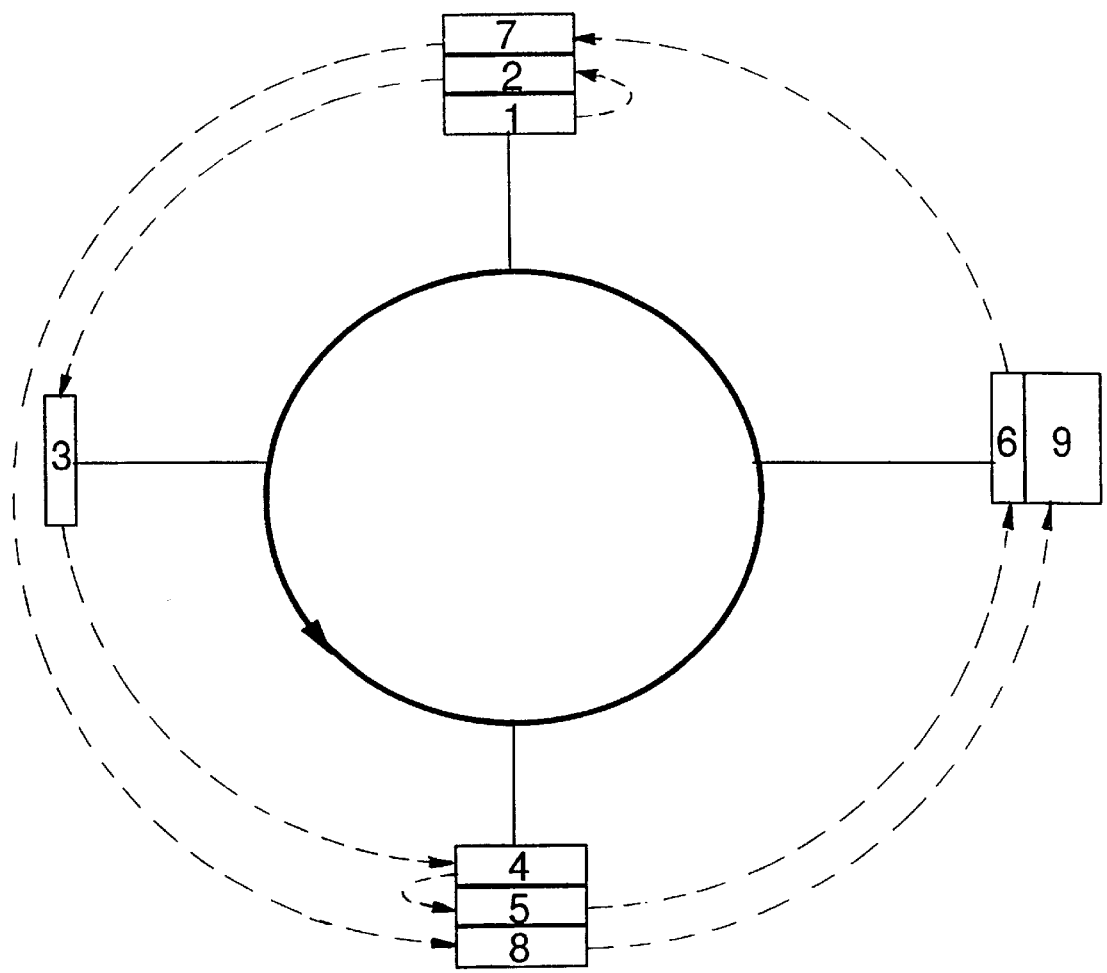
FIG. 13 is a schematic representation of a circularly linked list, with job queues for a number of users.

The remaining data objects in the results vector are the full images and their associated digital signatures. These form an input list of post-retrieval processing jobs. The queue manager takes 340 a first job from the head of this list, and compares 350 the requester ID with a lookup table of authorised users to determine whether watermarking is required. If there is no match in the table, watermarking is required. The data object to be processed is then placed 380,410 into one of two circularly linked lists according to the processing which is required. A circularly linked list is represented schematically in FIG. 13.

If there is a match, confirming the requester as an authorised user not requiring watermarking, then the data object is to be placed in a circularly linked list from which objects are to be retrieved for signature checking and format conversion. We will refer to this circularly linked list as the 'fast ring', since the processing operations to be performed are relatively fast compared with watermarking. A check is performed 390 of whether the user already has an entry in this fast ring. If yes, then the job of processing this data object is added 410 to the user's queue of jobs within the fast ring. If no, then an entry in the fast ring is created 400 prior to adding the job to the user's queue.

If there was no match in the ID lookup table, then a check is performed 360 of whether the user has an entry in a 'slow ring' (circularly linked list of jobs requiring watermarking). If not, then an entry is created 370. The processing job is then added 380 to the user's queue in the slow ring.

The queue manager continues taking objects from the post-retrieval-processing input list and placing them into the respective user's queue in the appropriate one of either the fast ring or the slow ring until there are no more jobs in the list.

Each time a job is added to the fast or slow queue, a work scheduler for an appropriate worker thread 38 is notified 430 that work is available for processing. The work scheduler is a component of the queue manager 48 which manages the assigning of available worker threads to work items, taking a worker thread from a worker queue and assigning it 440 to the newly generated list of work. Separate work schedulers run for the fast and slow rings.

The respective work scheduler thus performs a determination 450 of whether there is both work to be done and a worker process 38 available for the current user. If the result of the determination is negative, the scheduler sleeps 460 until a notification of available work or of an available worker thread is received. If the result is positive, the work scheduler creates a list of tasks to be performed by a respective worker thread, the tasks being indexed by user ID.

The worker thread will perform its processing tasks in accordance with a resource allocation schedule controlled by the work scheduler. The work scheduler allocates specific processing resource "points" as a function of user ID, in accordance with instructions from a system administrator. These points determine an amount of processing that is to be performed for a particular user each time their requests are processed. That is, the system administrator has determined how much processing should be performed for each user each time the sequence of processing of the circularly linked list progresses to that user. This allocation is done separately for each of the fast and slow tasks.

Let us assume that different groups of users each has allocated either N, P or Q points for slow processing, and n, p, or q points for fast processing. During processing of slow jobs, the work scheduler determines 460 the user's allocated points for the slow queue and attributes points M to the next job in the list and decrements 470 the relevant user's points allocation by points M. The attributed points are typically a fixed number of points, or a "cost", for each type of task but may be a variable number of points according to the size of the data object to be processed. These costs should reflect the performance of the relevant hardware and software in use.

If the user has N points (N≧M) the M-point job will be removed 480 from the user's processing operations queue and added to a "work to do" list for the worker thread. If that user has points remaining from their N points and there are more processing tasks to be performed for that user (determination 490), then the scheduler proceeds to the next job in that user's queue and determines whether there are sufficient points available for that next job (for a job requiring Q points, is N−M greater than or equal to Q). If there are no more jobs in that user's queue in the respective ring then the user's entry in the ring is removed 500. If the user has no points remaining, or insufficient for the next job in that user's queue, then the scheduler advances 510 to the next user in the ring—and will only return to that user's queue after servicing each other user who currently has work in their queue. The work scheduler thus constructs a sequenced "work to do" list and provides this to the worker process.

The worker process 38 relevant to a respective one of the fast or slow rings notifies 520 its work manager 56, which in turn notifies 525 the respective work scheduler, of the worker's availability to accept new work (for example, after it has sent 530 a previous result vector to the work manager 56 for transfer to cache). Then, on receipt of the "work to do" list from the scheduler, the worker process 38 creates 540 an empty new results vector for holding the results of its processing. It checks 550 whether a work item remains in the list and, if so, checks 560 whether signature checking is required. In most cases, signature checking will be required. The signature check is performed 570. This entails a calculation of the expected digital signature based on information within the original request which information was obtained from the client database, and comparison with the digital signature which was retrieved from the data library in association with the image.

If the image fails its signature check, then it is marked 590 as "failed" and the worker thread moves to the next item in the list. In the case of a worker thread for the slow ring, if the signature check is passed, a determination is next performed 600 of whether watermarking is required. If yes, a determination is performed 610 of whether the required watermark image is available. If not available, then the watermark image is generated 620. A watermark image "cleaner" thread comprising a component of the watermarker process 38 is invoked at this stage to enable deletion if a locking step fails to complete. The watermark image is then locked 630 to avoid deletion, and is then applied 640 to the image object using a conventional watermarking algorithm.

Subsequent processing steps by the worker thread are similar for a watermarker-type thread and a worker thread processing the fast ring. A determination is next performed 650 of whether any further processing tasks are required. In the present embodiment, all full images require conversion from TIFF to a JPEG format and so this conversion is performed 660 (using conventional methods).

The processing job is then marked 670 as passed or failed, the image size is recorded if passed, and the worker thread proceeds to the next job. When there are no more work items in the "work to do" list, the worker thread sends 530 a result vector to the worker manager 56. The worker manager receives 680 the results and sends them 690 to the cache manager 50 which stores the results in cache memory of the server system.

From this point on, if subsequent requests are received from an end user, the processed images are available in cache and so can be delivered to the client system for display to the end user without delay. It will be clear to persons skilled in the art that such post-retrieval processing and delivery of processed images to cache may be completed, subject to system performance and the numbers of concurrent user requests, for some or even all images before a request is submitted for an individual selected full image.

Thus, watermark processing and storing the watermarked images within local cache memory begins for the associated full images before the end user has selected a particular full image to be delivered to them. This pre-fetch and pre-process policy based on anticipated subsequent requests reduces the delivery delay experienced by an end user and also shields the end user from any need to be informed of the steps performed to retrieve and process images prior to delivery.

The reduction in delays which are achieved as described above, together with the automatic generation of a Web browser request which identifies a desired object and triggers automated data retrieval from cache or (if necessary) from an external repository, makes transparent the staged nature of the image retrieval, processing and delivery. The end user does not need to know where an object is stored in a distributed data retrieval system or, if a number of possible copies of an object may be retrieved from different places, which copy has been retrieved.

The end user can be given the impression that all images are available locally from the data retrieval system's cache even if most requests require access to the data library before they can be satisfied.

A further enhancement of the system, which further reduces end user waiting, is an adaptation of the queue manager to respond to requests for delivery of specific full images after the pre-fetch processing of the relevant Annex has been initiated but before watermarking is complete, by determining which ring the post-retrieval processing job for this image may be in, locating the user's entry in the ring and, if the processing job is still in the user's queue awaiting processing, promoting the job to the head of the user's queue.

The watermarking task is limited to a single watermarking process per available processor, with the number of available processors depending on the particular server system 10. Thus, if a single processor is all that is available, then a second item is retrieved from the watermarking input list only after processing of the first item is complete. Overall throughput would be reduced by running multiple such threads in parallel on a single processor.

Retrieval threads are not processor-intensive; they are disk intensive. Their assignment to processors is system-dependent and is strongly influenced by the characteristics of the particular image (large data object) storage and retrieval facility.

As noted above, operations involving only retrieval, possible digital signature checking and possible format conversion are handled by a separate processing thread (or number of threads) to operations additionally requiring watermarking. Whenever one such processing thread completes its current work, writing data out to the cache, it requests more work from the scheduler. The next user in the appropriate ring is selected and as much work assigned from that ring to the Retriever or Watermarker as that user has 'points' for.

By separating retrieval from retrieval-and-watermark, those users not requiring watermarking are not overly impacted by the resource demands of users requesting data objects which require this process. By restricting watermarking threads to one per processor, watermarking throughput is maximised. The queuing and costing of retrieval, signature checking and watermarking functions ensures that fair resource allocation can be achieved in the situation of multiple concurrent requesting users.

In the above described preferred embodiment of the invention, whether a job is to be placed in a circularly linked list for post-retrieval processing, and which one of a plurality of linked lists, is determined from the object type and the processing tasks which are predefined to be required for objects of that type as well as the ID of the requester. Some trusted groups of users do not require watermarking of any objects. Alternatively, whether and which queue to place a task in may be determined solely with reference to the object type. Since signature checking does not involve significant processing resources, it is preferred for signature checking to be performed for all requests (except during system test or configuration when the process may be switched off).

In accordance with one alternative embodiment of the invention, the object 'types' distinguished by the resource manager are not limited to full images and thumbnails; instead the queue manager compares requested object names with a lookup table of named object types which require watermarking. If the object name matches with an entry in the list, then the queue manager flags the retrieval operation as one requiring performance of watermarking. In some distributed data retrieval systems which can access more than one data repository, it may be that only objects retrieved from some repositories or only some categories of objects within a repository require dynamic watermarking.

It will be recognised by those skilled in the art that other modifications may be made to a method or a system substantially as described above while remaining within the scope of the invention. For example, components of the data retrieval system described above such as the data library connection component may be either local to or, if the components are distributed, remote from the main data retrieval system. If local, the data library connection component may transfer its results directly to the cache rather than via the queue manager as described above.

What is claimed is:

1. A method for retrieving data using a data retrieval system, in response to data retrieval requests, the method including:
    responsive to receipt of data retrieval requests by the data retrieval system, identifying requested data retrieval operations requiring a first predetermined processor-intensive task to be performed;
    separating the identified processor-intensive data retrieval operations from other data retrieval operations by inputting into a first processing queue only the data retrieval operations requiring said first predetermined processor-intensive task to be performed;
    processing data retrieval operations which do not require said first predetermined task to be performed separately from data retrieval operations in the first pocessing queue;
    processing the data retrieval operations in the first processing queue including performing said first predetermined processor-intensive task; and
    delivering the processed data to the requester.

2. A data retrieval method according to claim 1 including:
    inputting into a second processing queue separate from said first queue data retrieval operations which require performance of a second predetermined task but do not require performance of said first predetermined task; and
    processing said first and second queues independently.

3. A data retrieval method according to claim 2 wherein the second predetermined task is a data format conversion task.

4. A data retrieval method according to claim 1, wherein the step of identifying requested data retrieval operations requiring performance of said first task includes comparison between data object metadata obtained from the data retrieval requests and a lookup table relating data objects to required processing tasks.

5. A data retrieval method according to claim 1, wherein said first processing queue comprises a plurality of queues and data retrieval operations are allocated between said plurality of queues according to the size of the requested data objects.

6. The method according to claim 1, wherein said predefined unit of processing corresponds to the amount of processing required to complete a predefined number of processing tasks.

7. The method according to claim 1, wherein said predefined unit of processing is a predefined processor operation time.

8. A method for allocating data processing resources between users of a data retrieval system, the method including:
    inputting data retrieval requests to a scheduler within the data retrieval system;
    identifying requested data retrieval operations requiring performance of a first predetermined processor-intensive task;
    retrieving requested data objects from a repository;
    separating the identified processor-intensive data retrieval operations from other data retrieval operations by inputting into a first circularly-linked-list the data retrieval operations requiring performance of said predetermined task, the operations being indexed according to their end user requesters;
    processing data retrieval operations which do not require performance of said predetermined task separately from data retrieval operations in the first pocessing queue; and
    processing data retrieval operations in said first circularly-linked-list, including performing said predetermined task, in a circular sequence such that a predefined unit of processing is performed for each end user requester in turn.

9. A method according to claim 8, including
    inputting into a second circularly-linked list separate from the first circularly-linked-list data retrieval operations which do not require performance of said first predetermined task but do require performance of a second post-retrieval task, the operations in the second list being indexed according to their end user requesters; and
    processing the second list in a circular sequence independent of processing of the first list such that for each list a predefined unit of processing is performed for each end user requester in turn.

10. A method according to claim 8, wherein said predefined unit of processing corresponds to the amount of processing required to complete a predefined number of processing tasks.

11. A method according to claim 8, wherein said predefined unit of processing is a predefined processor operation time.

12. A method of retrieving requested data objects via a data retrieval system, wherein the system is responsive to received requests identifying a required data object container to
    retrieve from a data repository the contents of the data object container;
    determine which of the data objects within the container require performance of a processor-intensive post-retrieval processing task prior to delivery to the requester;
    initiate performance of said required processor-intensive post-retrieval processing task for the data objects within the container; and
    transfer to a system cache the processed data objects resulting from said post-retrieval processing;
    and wherein the system is responsive to subsequent requests identifying a required one or more of said container's data objects to access the cache to obtain said one or more data objects.

13. A method according to claim 12, wherein the system is responsive to receipt of a request identifying a required one or more of said container's data objects, which request is received after said initiation of performance of the post-retrieval processing but before its completion, to promote said data object as the next data object to be processed.

14. A data retrieval system for retrieving stored data objects from a repository, the system including:
- means for receiving data retrieval requests;
- means for establishing a connection to said repository for retrieval of one or more stored data objects;
- a resource manager adapted to identify from said requests data retrieval operations requiring a first predetermined processor-intensive task to be performed and adapted to enqueue, subsequent to retrieval of said one or more data objects from the repository, said identified data retrieval operations requiring performance of said first predetermined processor-intensive task for processing separately from other data retrieval operations;
- a process for performing said first predetermined processor-intensive task on the operations in said queue; and
- means for delivering to the requester the processed retrieved data objects.

15. A system according to claim 14, including
- a repository wherein stored image objects are arranged in containers, each containing a plurality of thumbnail images and full images; and wherein the resource manager is responsive to data retrieval requests identifying a container to
- retrieve the contents of the identified container,
- deliver the thumbnail images within said container to the requester, and
- enqueue said full images within said container for performance of said first predetermined task prior to receipt by the system of a request for delivery of a specific one of said full images, which request for said full image is separate from said container-identifying request.

16. An article of manufacture comprising a computer usable medium having computer readable program code means embodied therein for retrieving data using a data retrieval system, in response to data retrieval requests, the computer readable program code means in said article of manufacture comprising computer readable program code means for causing a computer to effect:
- being responsive to receipt of data retrieval requests by the data retrieval system, identifying requested data retrieval operations requiring a first predetermined task to be performed;
- inputting into a first processing queue only the data retrieval operations requiring said first predetermined task to be performed;
- handling data retrieval operations which do not require said first predetermined task to be performed without performing said first predetermined task;
- processing the data retrieval operations in the first processing queue including performing said first processing task; and
- delivering the processed data to the requester.

17. An article of manufacture as recited in claim 16, the computer readable program code means in said article of manufacture further comprising computer readable program code means for causing a computer to effect:
- inputting into a second processing queue separate from said first queue data retrieval operations which require performance of a second predetermined task but do not require performance of said first predetermined task; and
- processing said first and second queues independently.

18. An article of manufacture as recited in claim 16, wherein the step of identifying requested data retrieval operations requiring performance of said first task includes comparison between data object metadata obtained from the data retrieval requests and a lookup table relating data objects to required processing tasks.

19. An article of manufacture as recited in claim 16, wherein said first processing queue is a circularly-linked list to which requested data retrieval operations are added, the operations being indexed according to the ID's of their end user requesters, and wherein the data retrieval operations in said circularly-linked-list are processed in a circular sequence such that a predefined unit of processing is performed for each end user requester in turn.

20. A computer program product comprising a computer usable medium having computer readable program code means embodied therein for allocating data processing resources between users of a data retrieval system, the computer readable program code means in said computer program product comprising computer readable program code means for causing a computer to effect:
- inputting data retrieval requests to a scheduler within the data retrieval system;
- identifying requested data retrieval operations requiring performance of a first predetermined processor-intensive task;
- retrieving requested data objects from a repository;
- inputting into a first circularly-linked-list the data retrieval operations requiring performance of said predetermined task, the operations being indexed according to their end user requesters;
- handling data retrieval operations which do not require performance of said predetermined task without performing said predetermined task; and
- processing data retrieval operations in said first circularly-linked-list, including performing said predetermined task, in a circular sequence such that a predefined unit of processing is performed for each end user requester in turn.

21. A computer program product as recited in claim 20, the computer readable program code means in said computer program product further comprising:
- inputting into a second circularly-linked list separate from the first circularly-linked-list data retrieval operations which do not require performance of said first predetermined task but do require performance of a second post-retrieval task, the operations in the second list being indexed according to their end user requesters; and
- processing the second list in a circular sequence independent of processing of the first list such that for each list a predefined unit of processing is performed for each end user requester in turn.

22. A program storage device readable by machine, tangibly embodying a program of instructions executable by the machine to perform method steps for retrieving requested data objects via a data retrieval system, wherein the system is responsive to received requests identifying a required data object container to:
- retrieve from a data repository the contents of the data object container;
- determine which of the data objects within the container require post-retrieval processing prior to delivery to the requester;

initiate performance of said required post-retrieval processing for the data objects within the container; and transfer to a system cache the processed data objects resulting from said post-retrieval processing;

and wherein the system is responsive to subsequent requests identifying a required one or more of said container's data objects to access the cache to obtain said one or more data objects.

23. A program storage device readable by machine as recited in claim 22, wherein the system is further responsive to receipt of a request identifying a required one or more of said container's data objects, which request is received after said initiation of performance of the post-retrieval processing but before its completion, to promote said data object as the next data object to be processed.

* * * * *